(12) United States Patent
Williams et al.

(10) Patent No.: US 9,081,792 B1
(45) Date of Patent: Jul. 14, 2015

(54) OPTIMIZING BACKUP OF WHITELISTED FILES

(71) Applicant: STORAGECRAFT TECHNOLOGY CORPORATION, Draper, UT (US)

(72) Inventors: Stephen Williams, South Jordan, UT (US); Nathan S. Bushman, Springville, UT (US)

(73) Assignee: STORAGECRAFT TECHNOLOGY CORPORATION, Draper, UT (US)

( * ) Notice: Subject to any disclaimer, the term of this patent is extended or adjusted under 35 U.S.C. 154(b) by 0 days.

(21) Appl. No.: 14/577,152

(22) Filed: Dec. 19, 2014

(51) Int. Cl.
*G06F 17/30* (2006.01)

(52) U.S. Cl.
CPC .............................. *G06F 17/30156* (2013.01)

(58) Field of Classification Search
None
See application file for complete search history.

(56) References Cited

U.S. PATENT DOCUMENTS

| | | | | |
|---|---|---|---|---|
| 5,765,173 A * | 6/1998 | Cane et al. | | 707/640 |
| 7,024,581 B1 * | 4/2006 | Wang et al. | | 714/2 |
| 7,996,371 B1 * | 8/2011 | Deshmukh | | 707/692 |
| 8,521,692 B1 * | 8/2013 | Ogata | | 707/640 |
| 8,572,163 B1 * | 10/2013 | Bromley et al. | | 709/203 |
| 8,751,515 B1 * | 6/2014 | Xing et al. | | 707/755 |
| 8,849,768 B1 * | 9/2014 | Agrawal | | 707/664 |
| 8,949,208 B1 * | 2/2015 | Xu et al. | | 707/698 |
| 2008/0235299 A1 * | 9/2008 | Haselton et al. | | 707/204 |
| 2008/0243879 A1 * | 10/2008 | Gokhale et al. | | 707/100 |
| 2009/0164529 A1 * | 6/2009 | McCain | | 707/204 |
| 2009/0249005 A1 * | 10/2009 | Bender et al. | | 711/162 |
| 2011/0125720 A1 * | 5/2011 | Jayaraman | | 707/692 |
| 2012/0084518 A1 * | 4/2012 | Vijayan et al. | | 711/162 |
| 2013/0218847 A1 * | 8/2013 | Saika | | 707/692 |
| 2014/0095439 A1 * | 4/2014 | Ram | | 707/640 |
| 2014/0149476 A1 * | 5/2014 | Kishimoto et al. | | 707/827 |
| 2014/0188805 A1 * | 7/2014 | Vijayan | | 707/646 |

* cited by examiner

*Primary Examiner* — Bai D. Vu
(74) *Attorney, Agent, or Firm* — Maschoff Brennan (57) ABSTRACT

Optimizing backup of whitelisted files. In one example embodiment, a method of optimizing backup of whitelisted files may include a whitelist analysis phase that may include identifying a set of allocated blocks in a source storage at a point in time, identifying whitelisted files that are already stored in a deduplication storage, and determining whether one of the whitelisted files is stored in the source storage by analyzing file attribute data stored in file system metadata in the source storage. If so, the whitelist analysis phase may include pruning the set of allocated blocks to exclude the allocated blocks that correspond to content of the one whitelisted file and associating logical locations of the content of the one whitelisted file as stored in the source storage with logical locations of the content of the one whitelisted file as stored in the deduplication storage.

11 Claims, 8 Drawing Sheets

OPTIMIZING BACKUP OF WHITELISTED FILES

FIELD

The embodiments disclosed herein relate to optimizing backup of whitelisted files.

BACKGROUND

A storage is computer-readable media capable of storing data in blocks. Storages face a myriad of threats to the data they store and to their smooth and continuous operation. In order to mitigate these threats, a backup of the data in a storage may be created at a particular point in time to enable the restoration of the data at some future time. Such a restoration may become desirable, for example, if the storage experiences corruption of its stored data, if the storage becomes unavailable, or if a user wishes to create a second identical storage.

A storage is typically logically divided into a finite number of fixed-length blocks. A storage also typically includes a file system which tracks the locations of the blocks that are allocated to each file that is stored in the storage. The file system also tracks the blocks that are not allocated to any file. The file system generally tracks allocated and unallocated blocks using specialized data structures, referred to as file system metadata. File system metadata is also stored in designated blocks in the storage.

Various techniques exist for backing up a source storage. One common technique involves backing up individual files stored in the source storage on a per-file basis. This technique is often referred to as file backup. File backup uses the file system of the source storage as a starting point and performs a backup by writing the files to a destination storage. Using this approach, individual files are backed up if they have been modified since the previous backup. File backup may be useful for finding and restoring a few lost or corrupted files. However, file backup may also include significant overhead in the form of bandwidth and logical overhead because file backup requires the tracking and storing of information about where each file exists within the file system of the source storage and the destination storage.

Another common technique for backing up a source storage ignores the locations of individual files stored in the source storage and instead simply backs up all allocated blocks stored in the source storage. This technique is often referred to as image backup because the backup generally contains or represents an image, or copy, of the entire allocated contents of the source storage. Using this approach, individual allocated blocks are backed up if they have been modified since the previous backup. Because image backup backs up all allocated blocks of the source storage, image backup backs up both the blocks that make up the files stored in the source storage as well as the blocks that make up the file system metadata. Also, because image backup backs up all allocated blocks rather than individual files, this approach does not necessarily need to be aware of the file system metadata or the files stored in the source storage, beyond utilizing minimal knowledge of the file system metadata in order to only back up allocated blocks since unallocated blocks are not generally backed up.

An image backup can be relatively fast compared to file backup because reliance on the file system is minimized. An image backup can also be relatively fast compared to a file backup because seeking is reduced. In particular, during an image backup, blocks are generally read sequentially with relatively limited seeking. In contrast, during a file backup, blocks that make up individual files may be scattered, resulting in relatively extensive seeking.

One common problem encountered when backing up multiple similar source storages to the same destination storage using image backup is the potential for redundancy within the backed-up data. For example, if multiple source storages utilize the same commercial operating system, such as WINDOWS® 8.1, they may store a common set of system files which will have identical blocks. If these source storages are backed up to the same destination storage, these identical blocks will be stored in the destination storage multiple times, resulting in redundant blocks. Redundancy in a destination storage may increase the overall size requirements of destination storage and increase the bandwidth overhead of transporting blocks to the destination storage.

The subject matter claimed herein is not limited to embodiments that solve any disadvantages or that operate only in environments such as those described above. Rather, this background is only provided to illustrate one example technology area where some embodiments described herein may be practiced.

SUMMARY

In general, example embodiments described herein relate to optimizing backup of whitelisted files. The whitelisted files may be stored in a source storage and the optimizing of the backup of the whitelisted files may occur during an image backup of the source storage. The example methods disclosed herein may be employed to identify and avoid backing up whitelisted files, such as common operating system files and common application files, that are already stored in a destination storage, and instead associate logical locations of the content of the whitelisted files as stored in the source storage with logical locations of the content of the whitelisted files as stored in the destination storage. In this manner, much of the overhead associated with backing up the content of the whitelisted files may be avoided.

In one example embodiment, a method of optimizing backup of whitelisted files in a source storage during deduplication of the source storage may include a whitelist analysis phase that may include identifying a set of allocated blocks in a source storage at a point in time, identifying whitelisted files that are already stored in a deduplication storage, and determining whether one or more of the whitelisted files are stored in the source storage by analyzing file attribute data stored in file system metadata in the source storage. If one or more of the whitelisted files are stored in the source storage, the whitelist analysis phase may include pruning the set of allocated blocks to exclude the allocated blocks that correspond to content of the one or more whitelisted files and associating logical locations of the content of the one or more whitelisted files as stored in the source storage with logical locations of the content of the one or more whitelisted files as stored in the deduplication storage.

In another example embodiment, a method of optimizing backup of whitelisted files in a source storage during deduplication of the source storage may include a whitelist analysis phase, an analysis phase, and a backup phase. The whitelist analysis phase may include identifying a set of allocated blocks in a source storage at a point in time, identifying whitelisted files that are already stored in a deduplication storage, and determining whether one or more of the whitelisted files are stored in the source storage by analyzing file attribute data stored in file system metadata in the source storage. If one or more of the whitelisted files is stored in the source storage, the whitelist analysis phase may include pruning the set of allocated blocks to exclude the allocated blocks that correspond to content of the one or more whitelisted files and associating logical location of the content of the one or more whitelisted files as stored in the source storage with logical locations of the content of the one or more whitelisted files as stored in the deduplication storage. The analysis phase may be performed after completion of the whitelist analysis phase and may include, for each block in the pruned set of allocated blocks, determining if the allocated block is duplicated in the deduplication storage. If the allocated block is duplicated in the deduplication storage, the analysis phase may include associating a physical location of the allocated block as stored in the source storage with a physical location of the corresponding duplicated block as stored in the deduplication storage. The backup phase may be performed after completion of the analysis phase and may include, for each unique nonduplicate block in the pruned set of allocated blocks, storing the unique nonduplicate block in the deduplication storage and associating a physical location of the unique nonduplicate block as stored in the source storage with a physical location of the corresponding block as stored in the deduplication storage.

In yet another example embodiment, a method of optimizing backup of whitelisted files in a source storage during backup of the source storage may include identifying a set of allocated blocks in a source storage at a point in time, identifying whitelisted files that are already stored in a destination storage, and determining whether one or more of the whitelisted files are stored in the source storage by analyzing file attribute data stored in file system metadata in the source storage. If one or more of the whitelisted files are stored in the source storage, the method may include pruning the set of allocated blocks to exclude the allocated blocks that correspond to the content of the one or more whitelisted files, associating logical locations of the content of the one or more whitelisted files as stored in the source storage with logical locations of the content of the one or more whitelisted files as stored in the destination storage, storing the pruned set of allocated blocks in a full backup in the destination storage, restoring the pruned set of allocated blocks by reading the pruned set of allocated blocks from the full backup and storing the pruned set of allocated blocks in a restore storage in physical locations that match physical locations of the pruned set of allocated blocks as originally stored in the source storage at the point in time, and restoring the one or more whitelisted files. Restoring the one or more whitelisted files may include performing the following for the blocks that correspond to the content of the one or more whitelisted files: determining the physical locations corresponding to the logical locations of the blocks as stored in the destination storage, reading the blocks from the determined physical locations of the destination storage, determining the physical locations corresponding to the logical locations of the blocks as stored in the source storage at the point in time, and storing the blocks in physical locations of the restore storage that match the determined physical locations of the source storage.

It is to be understood that both the foregoing general description and the following detailed description are exemplary and explanatory and are not restrictive of the invention as claimed.

BRIEF DESCRIPTION OF THE DRAWINGS

Example embodiments will be described and explained with additional specificity and detail through the use of the accompanying drawings in which.

DESCRIPTION OF EMBODIMENTS

The term "storage" as used herein refers to computer-readable media, or some logical portion thereof such as a volume, capable of storing data in blocks. The term "block" as used herein refers to a fixed-length discrete sequence of bits. In some example embodiments, the size of each block may be configured to match the standard sector size of a file system of a storage on which the block is stored. For example, the size of each block may be 512 bytes (4096 bits) where 512 bytes is the size of a standard sector. In other example embodiments, the size of each block may be configured to be a multiple of the standard sector size of a file system of a storage on which the block is stored. For example, the size of each block may be 4096 bytes (32,768 bits) where 512 bytes is the size of a standard sector, which results in each block including eight sectors. The term "allocated block" as used herein refers to a block in a storage that is currently tracked as storing data by a file system of the storage. The term "free block" as used herein refers to a block in a storage that is not currently tracked as storing data by a file system of the storage. The term "backup" when used herein as a noun refers to a copy or copies of one or more blocks from a storage. The term "full backup" as used herein refers to a full backup of a storage that includes at least a copy of each unique allocated block of the storage at a point in time such that the full backup can be restored on its own to recreate the state of the storage at the point in time, without being dependent on any other backup. A "base backup" may also include nonunique allocated blocks and free blocks of the storage at the point in time. The term "incremental backup" as used herein refers to an at least partial backup of a storage that includes at least a copy of each unique allocated block of the storage that was modified between a previous point in time of a previous backup of the storage and the subsequent point in time of the incremental backup, such that the incremental backup, along with all previous backups of the storage, including an initial full backup of the storage, can be restored together to recreate the exact state of the storage at the subsequent point in time. An "incremental backup" may also include nonunique allocated blocks and free blocks of the storage that were modified between the previous point in time and the subsequent point in time. The term "modified block" as used herein refers to a block that was modified either because the block was previously allocated and changed or because the block was modified by being newly allocated. The term "decremental backup" as used herein refers to an at least partial backup of a storage that includes at least a copy of each unique allocated block from a full backup of the storage that corresponds to a block that was modified in the source storage between a previous point in time and a subsequent point in time, such that the decremental backup, along with all subsequent decremental backups of the storage, including a full backup of the storage, can be restored together to recreate the state of the storage at the previous point in time. A "decremental backup" may also include nonunique allocated blocks and free blocks from a full backup of the storage that correspond to blocks that were modified in the source storage between the point in time and the subsequent point in time. It is understood that a "full backup," an "incremental backup," and/or a "decremental backup" may exclude certain undesired allocated blocks such as blocks of data belonging to files whose contents are not necessary for restoration purposes, such as virtual memory pagination files and machine hibernation state files, and/or blocks of data belonging to files which are determined to be whitelist files.

Figure 1:
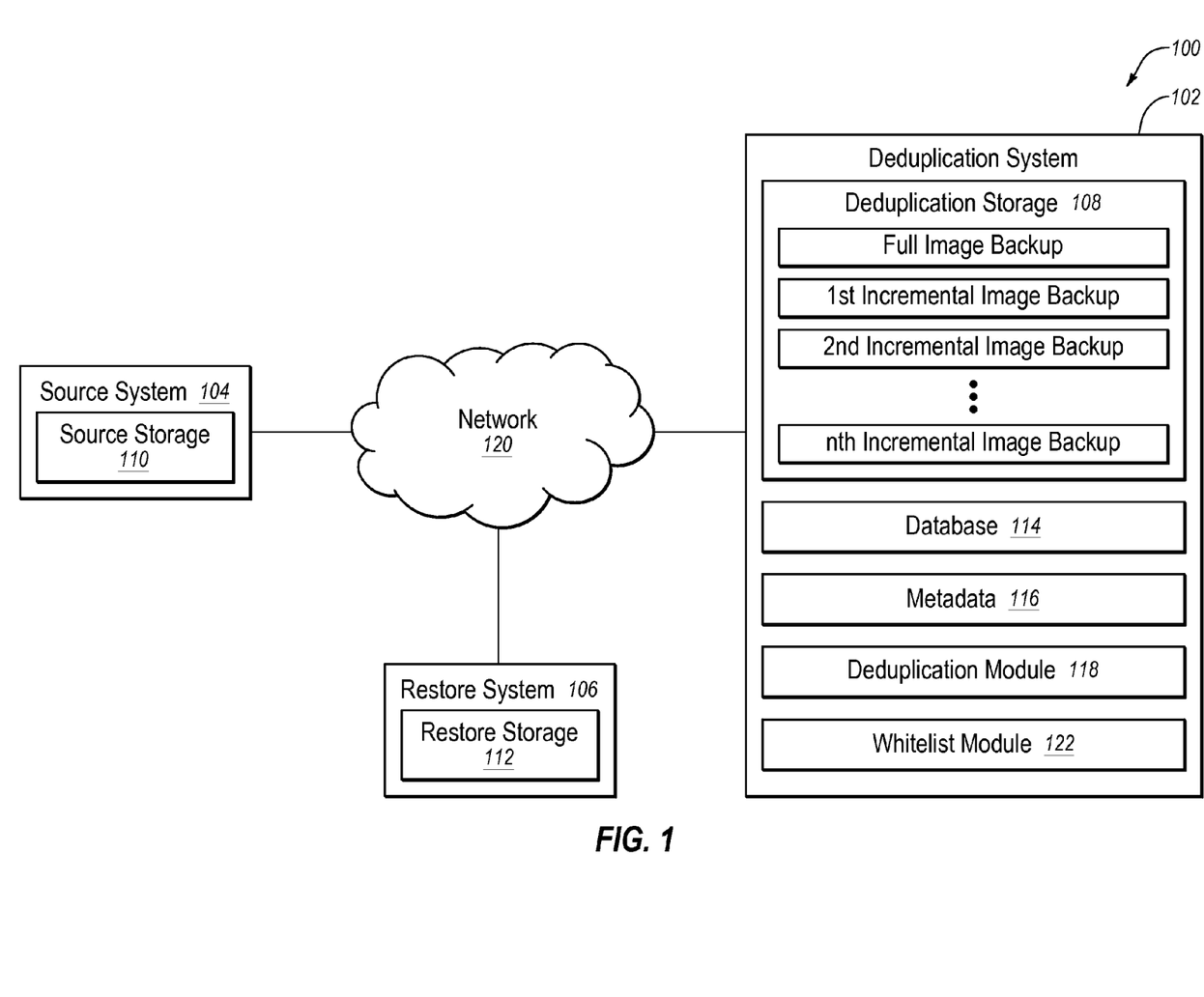
FIG. 1 is a schematic block diagram illustrating an example deduplication image backup system.

FIG. 1 is a schematic block diagram illustrating an example deduplication image backup system 100. As disclosed in FIG. 1, the system 100 includes a deduplication system 102, a source system 104, and a restore system 106. The systems 102, 104, and 106 include storages 108, 110, and 112, respectively. The deduplication storage 108 stores a full backup and multiple incremental backups that have been created of the source storage 110 at various points in time. For example, the full backup was created at time t(1), the 1st incremental backup was created at time t(2), the 2nd incremental backup was created at time t(3), and the nth incremental backup was created at time t(n+1). The deduplication system 102 also includes a database 114, metadata 116, a deduplication module 118, and a whitelist module 122. The systems 102, 104, and 106 are able to communicate with one another over a network 120.

Each of the systems 102, 104, and 106 may be any computing device capable of supporting a storage and communicating with other systems including, for example, file servers, web servers, personal computers, desktop computers, laptop computers, handheld devices, multiprocessor systems, microprocessor-based or programmable consumer electronics, smartphones, digital cameras, hard disk drives, flash memory drives, and virtual machines. The network 120 may be any wired or wireless communication network including, for example, a Local Area Network (LAN), a Metropolitan Area Network (MAN), a Wide Area Network (WAN), a Wireless Application Protocol (WAP) network, a Bluetooth network, an Internet Protocol (IP) network such as the internet, or some combination thereof.

The image backups stored in the deduplication storage 108 may be created by the deduplication module 118. For example, the deduplication module 118 may be configured to execute computer instructions to perform image backup operations of creating a full backup and multiple incremental backups of the source storage 110. It is noted that these image backups may initially be created on the source system 104 and then copied to the deduplication system 102.

For example, the full backup may be created to capture the state at time t(1). This image backup operation may include the deduplication module 118 copying all unique allocated blocks of the source storage 110 as allocated at time t(1) and storing the unique allocated blocks in the deduplication storage 108, or verifying that the unique allocated blocks of the source storage 110 as allocated at time t(1) are already stored in the deduplication storage 108. The state of the source storage 110 at time t(1) may be captured using snapshot technology in order to capture the blocks stored in the source storage 110 at time t(1) without interrupting other processes, thus avoiding downtime of the source storage 110. The full backup may be relatively large depending on the size of the source storage 110 and the number of allocated blocks at time t(1). As a result, the full backup may take a relatively long time to create and consume a relatively large amount of space in the deduplication storage 108.

Next, the 1st and 2nd incremental backups may be created to capture the states at times t(2) and t(3), respectively. This may include copying only modified unique allocated blocks of the source storage 110 present at time t(2) and storing the modified unique allocated blocks in the deduplication storage 108, or verifying that the modified unique allocated blocks of the source storage 110 present at time t(2) are already stored in the deduplication storage 108, then later copying only modified unique allocated blocks of the source storage 110 present at time t(3) and storing the modified unique allocated blocks in the deduplication storage 108, or verifying that the modified unique allocated blocks of the source storage 110 present at time t(3) are already stored in the deduplication storage 108. The states of the source storage 110 at times t(2) and t(3) may again be captured using snapshot technology, thus avoiding downtime of the source storage 110. Each incremental backup may include only those unique allocated blocks from the source storage 110 that were modified after the time of the previous backup. Thus, the 1st incremental backup may include only those unique allocated blocks from the source storage 110 that were modified between time t(1) and time t(2), and the 2nd incremental backup may include only those unique allocated blocks from the source storage 110 that were modified between time t(2) and time t(3). In general, as compared to the full backup, each incremental backup may take a relatively short time to create and consume a relatively small storage space in the deduplication storage 108.

Finally, an nth incremental backup may be created to capture the state at time t(n+1). This may include copying only modified unique allocated blocks of the source storage 110 present at time t(n+1), using snapshot technology, and storing the modified unique allocated blocks in the deduplication storage 108, or verifying that the modified unique allocated blocks of the source storage 110 present at time t(n+1) are already stored in the deduplication storage 108. The nth incremental backup may include only those unique allocated blocks from the source storage 110 that were modified between time t(n) and time t(n+1).

Therefore, incremental backups may be created on an ongoing basis. The frequency of creating new incremental backups may be altered as desired in order to adjust the amount of data that will be lost should the source storage 110 experience corruption of its stored blocks or become unavailable at any given point in time. The blocks from the source storage 110 can be restored to the state at the point in time of a particular incremental backup by applying the image backups to the restore storage 112 from oldest to newest, namely, first applying the full backup and then applying each successive incremental backup up to the particular incremental backup. Alternatively, the blocks from the source storage 110 can be restored to the state at the point in time of a particular incremental backup by applying the image backups to the restore storage 112 concurrently, namely, concurrently applying the full backup and each successive incremental backup up to the particular incremental backup.

Although only allocated blocks are included in the example incremental backups discussed above, it is understood that in alternative implementations both allocated and free blocks may be backed up during the creation of a full backup or an incremental backup. This is typically done for forensic purposes, because the contents of free blocks can be interesting where the free blocks contain data from a previous point in time when the blocks were in use and allocated. Therefore, the creation of full backups and incremental backups as disclosed herein is not limited to allocated blocks but may also include free blocks.

Further, although only full backups and incremental backups are discussed above, it is understood that the source storage 110 may instead be backed up by creating a full backup and one or more decremental backups. Decremental backups are created by initially creating a full backup to capture the state at an initial point in time, then updating the full backup to capture the state at a subsequent point in time by modifying only those blocks in the full backup that were modified between the initial and subsequent points in time. Prior to the updating of the full backup, however, any original blocks in the full backup that correspond to the modified blocks are copied to a decremental backup, thus enabling restoration of the source storage 110 at the initial point in time (by restoring the updated full backup and then restoring the decremental backup) or at the subsequent point in time (by simply restoring the updated full backup). Since restoring a single full backup is generally faster than restoring a full backup and one or more incremental or decremental backups, creating decremental backups instead of incremental backups may enable the most recent backup to be restored more quickly since the most recent backup is always a full backup instead of potentially being an incremental backup. Therefore, the methods disclosed herein are not limited to implementation on full and incremental backups, but may also include implementation on full and decremental backups.

The database 114 and the metadata 116 may be employed to track information related to the source storage 110, the deduplication storage 108, and the backups of the source storage 110 that are stored in the deduplication storage 108. For example, the database 114 and the metadata 116 may be identical in structure and function to the database 500 and the metadata 700 disclosed in related U.S. patent application Ser. No. 13/782,549, titled "MULTIPHASE DEDUPLICATION," which was filed on Mar. 1, 2013 and which is expressly incorporated herein by reference in its entirety.

In one example embodiment, the deduplication system 102 may be a network server, the source system 104 may be a first desktop computer, the restore system 106 may be a second desktop computer, and the network 120 may include the internet. In this example embodiment, the network server may be configured to periodically back up the storage of the first desktop computer over the internet as part of a backup job by creating the full backup and the multiple incremental backups stored in the deduplication storage 108. The first desktop computer may also be configured to track incremental changes to its storage between backups in order to easily and quickly identify only those blocks that were modified during the creation of an incremental backup. The network server may also be configured to restore one or more of the image backups to the storage of the second desktop computer over the internet if the first desktop computer experiences corruption of its storage or if the first desktop computer's storage becomes unavailable.

Although only a single storage is disclosed in each of the systems 102, 104, and 106 in FIG. 1, it is understood that any of the systems 102, 104, and 106 may instead include two or more storages. Further, although the systems 102, 104, and 106 are disclosed in FIG. 1 as communicating over the network 120, it is understood that the systems 102, 104, and 106 may instead communicate directly with each other. For example, in some embodiments any combination of the systems 102, 104, and 106 may be combined into a single system. Also, although the storages 108, 110, and 112 are disclosed as separate storages, it is understood that any combination of the storages 108, 110, and 112 may be combined into a single storage. For example, in some embodiments the source storage 110 may function as both a source storage during the creation of a backup and a restore storage during a restore of the backup, which may enable the source storage 110 to be restored to a state of an earlier point in time. Further, although the deduplication module 118 and the whitelist module 122 are the only modules disclosed in the example system 100 of FIG. 1, it is understood that the functionality of the modules 118 and 122 may be replaced or augmented by one or more similar modules residing on any of the systems 102, 104, or 106 or another system. Finally, although only a single source storage and a single restore storage are disclosed in the example system 100 of FIG. 1, it is understood that the deduplication system 102 of FIG. 1 may be configured to simultaneously back up multiple source storages and/or to simultaneously restore to multiple restore storages. For example, the greater the number of storages that are backed up to the deduplication storage 108 of the deduplication system 102, the greater the likelihood for reducing redundancy and for reducing the overall number of blocks being backed up, resulting in corresponding decreases in the overall size requirements of the deduplication storage 108 and in the bandwidth overhead of transporting blocks to the deduplication storage 108.

Having described one specific environment with respect to FIG. 1, it is understood that the specific environment of FIG. 1 is only one of countless environments in which the example methods disclosed herein may be practiced. The scope of the example embodiments is not intended to be limited to any particular environment.

FIGS. 2A-2E are schematic diagrams illustrating backup and restore of whitelisted files in the source storage 110 during backup and restore of the source storage 110. Although the source storage 110 and the restore storage 112 are depicted with eight blocks, and the deduplication storage 108 is depicted with sixteen blocks, in FIGS. 2A-2E, it is understood that the source storage 110, the restore storage 112, and the duplication storage 108 may include millions or billions of blocks, or potentially even more blocks. Also, although the whitelisted files in the whitelist 206 are depicted with only two, three, or five blocks in FIGS. 2A-2E, it is understood that whitelisted files may be much larger, such as files including blocks representing several gigabytes (GB) of data.

Figure 2A:
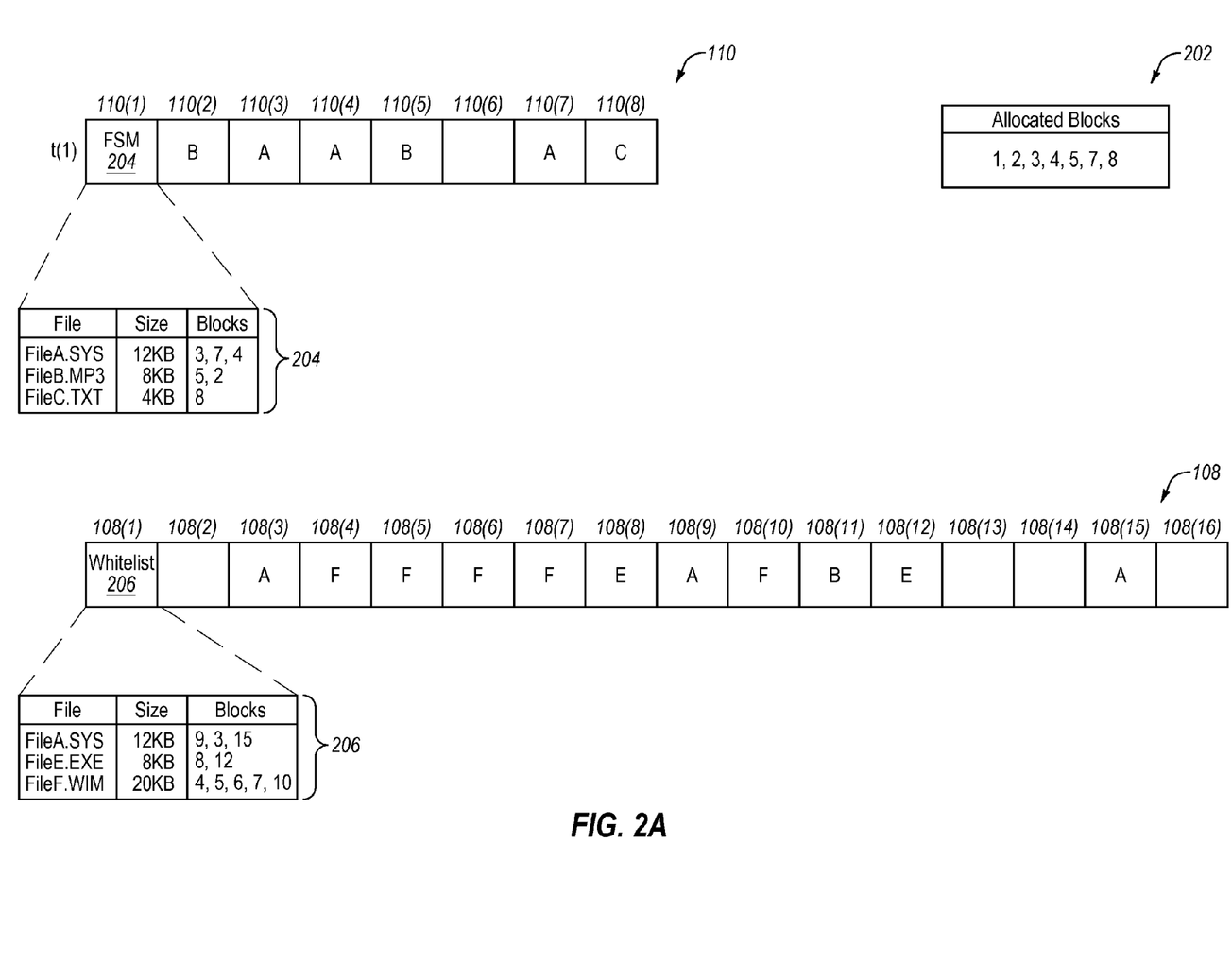
FIGS. 2A-2E are schematic diagrams illustrating backup and restore of whitelisted files in a source storage during backup and restore of the source storage.

As disclosed in FIG. 2A, prior to the backup and restore of the source storage 110, the deduplication storage 108 may have been seeded with blocks included in one or more whitelisted files of an operating system, such as WINDOWS® 8.1, and/or with blocks included in one or more whitelisted files of a software application, such as MICROSOFT® Word 2013. For example, as disclosed in FIG. 2A, the whitelist 206 indicates that blocks included in a whitelisted file of an operating system named "FileA.SYS" and in a whitelisted file of a software application named "FileE.EXE" were seeded into the deduplication storage 108.

In addition, the whitelist 206 indicates that blocks included in a file-based disk image file having a Windows Image Boot (WIMBoot) format named "FileF.WIM" was seeded into the deduplication storage 108. The example methods disclosed herein may be particularly useful when employed in connection with relatively large WIMBoot files. For example, in some WINDOWS® 8.1 deployments, the bulk of the operating system files may be found in a WIMBoot file named "INSTALL.WIM" in a fixed-state read-only. This WIMBoot file is about 3.5 GB in size. In additional, other files may also be stored in a second optional WIMBoot file named "CUSTOM.WIM" which may also be relatively large. Where either of these relatively large WIMBoot files is a whitelisted file, the example methods disclosed herein may be employed to backup this WIMBoot file in an optimized manner that avoids much of the overhead that would normally be associated with backing up the content of this WIMBoot file.

Figure 2B:
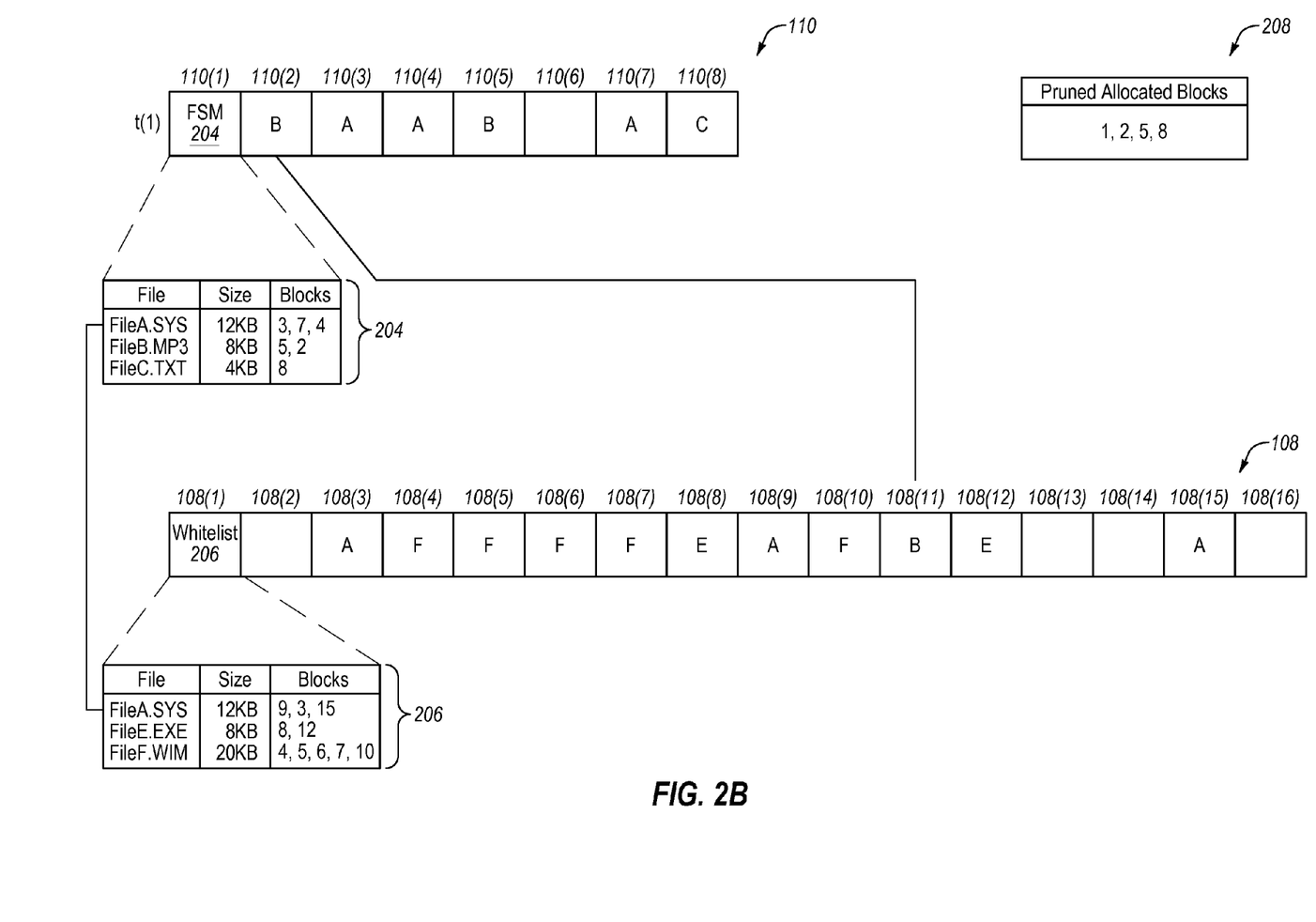
Figure 2C:
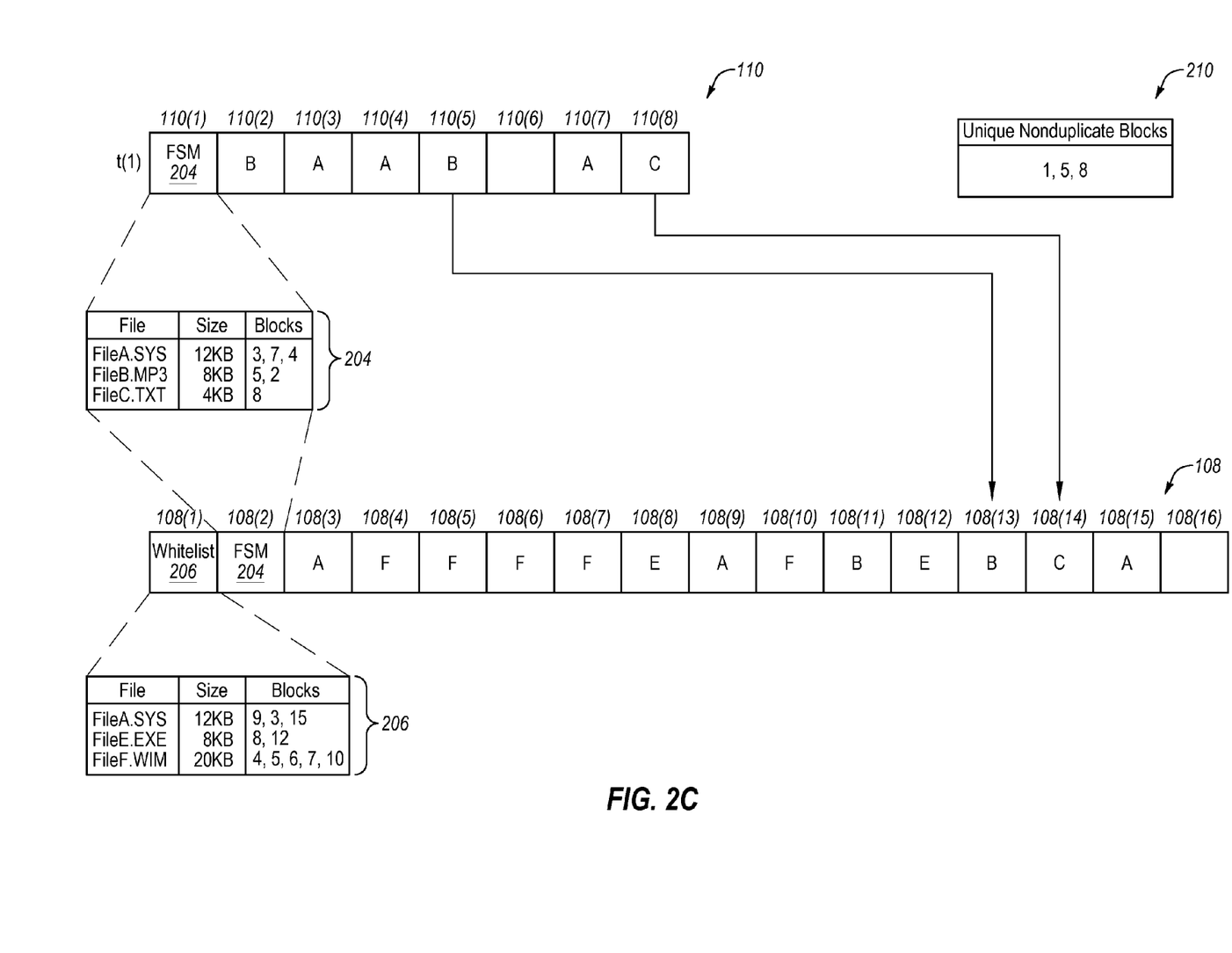
Figure 2D:
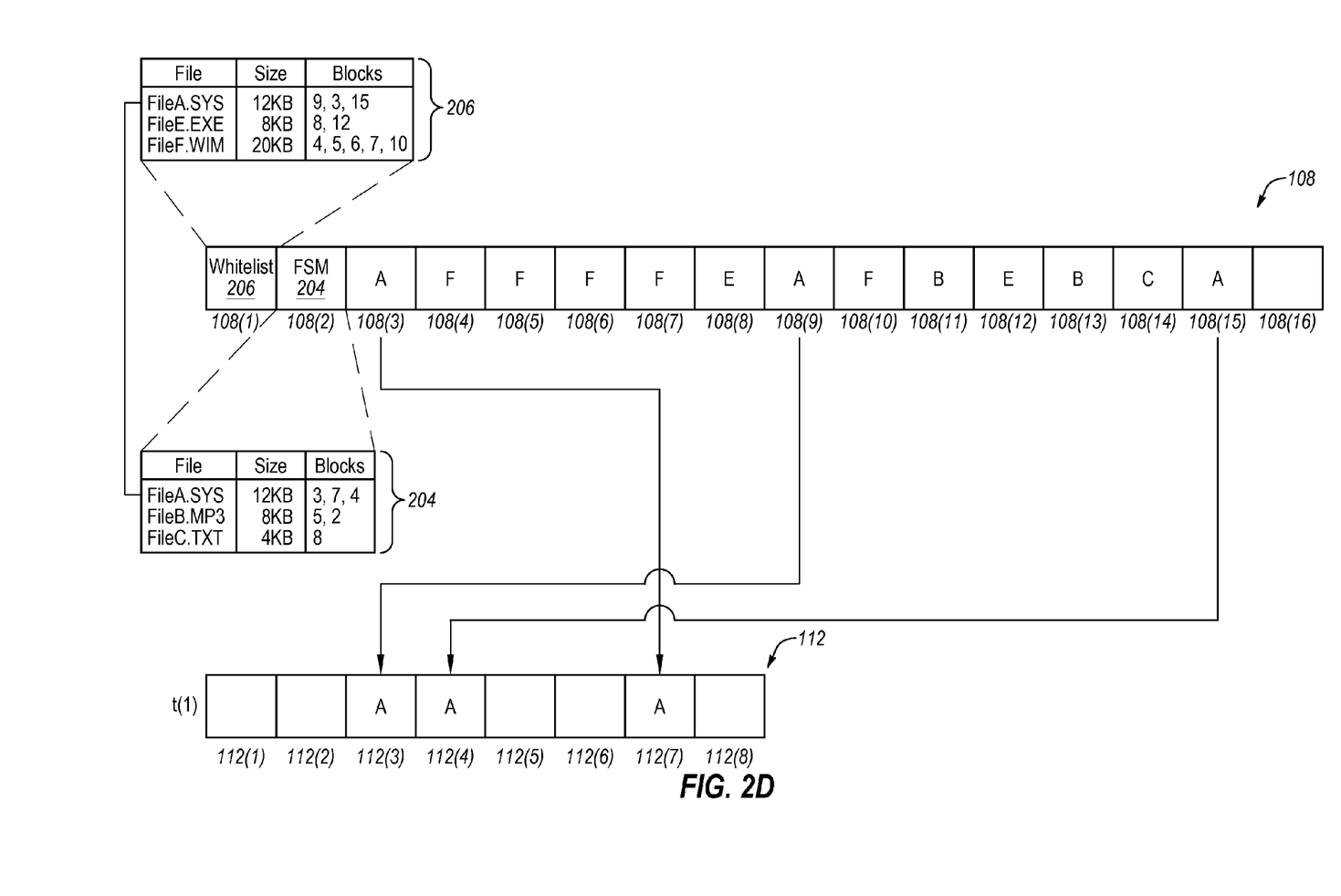
Figure 2E:
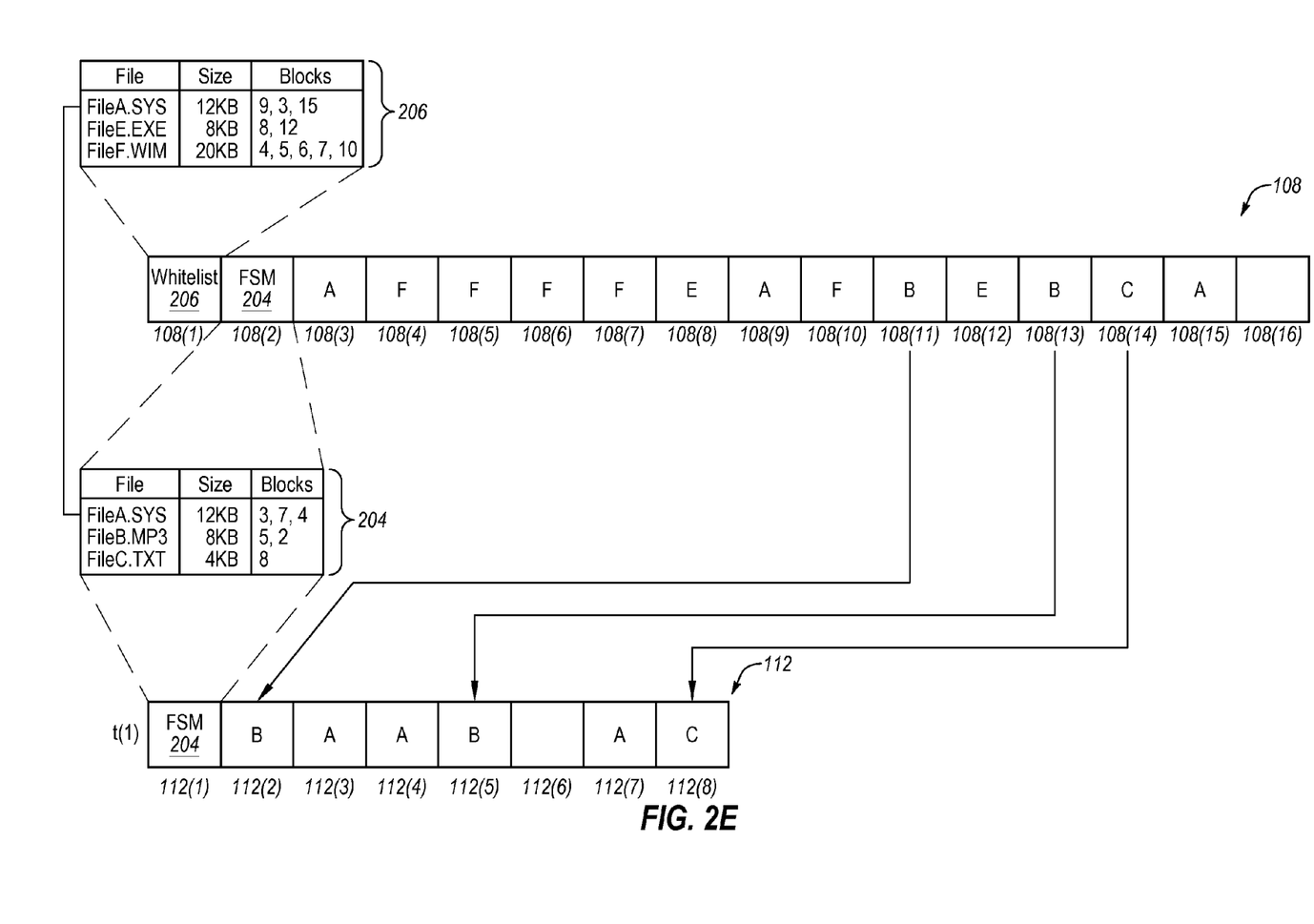
Figure 3A:
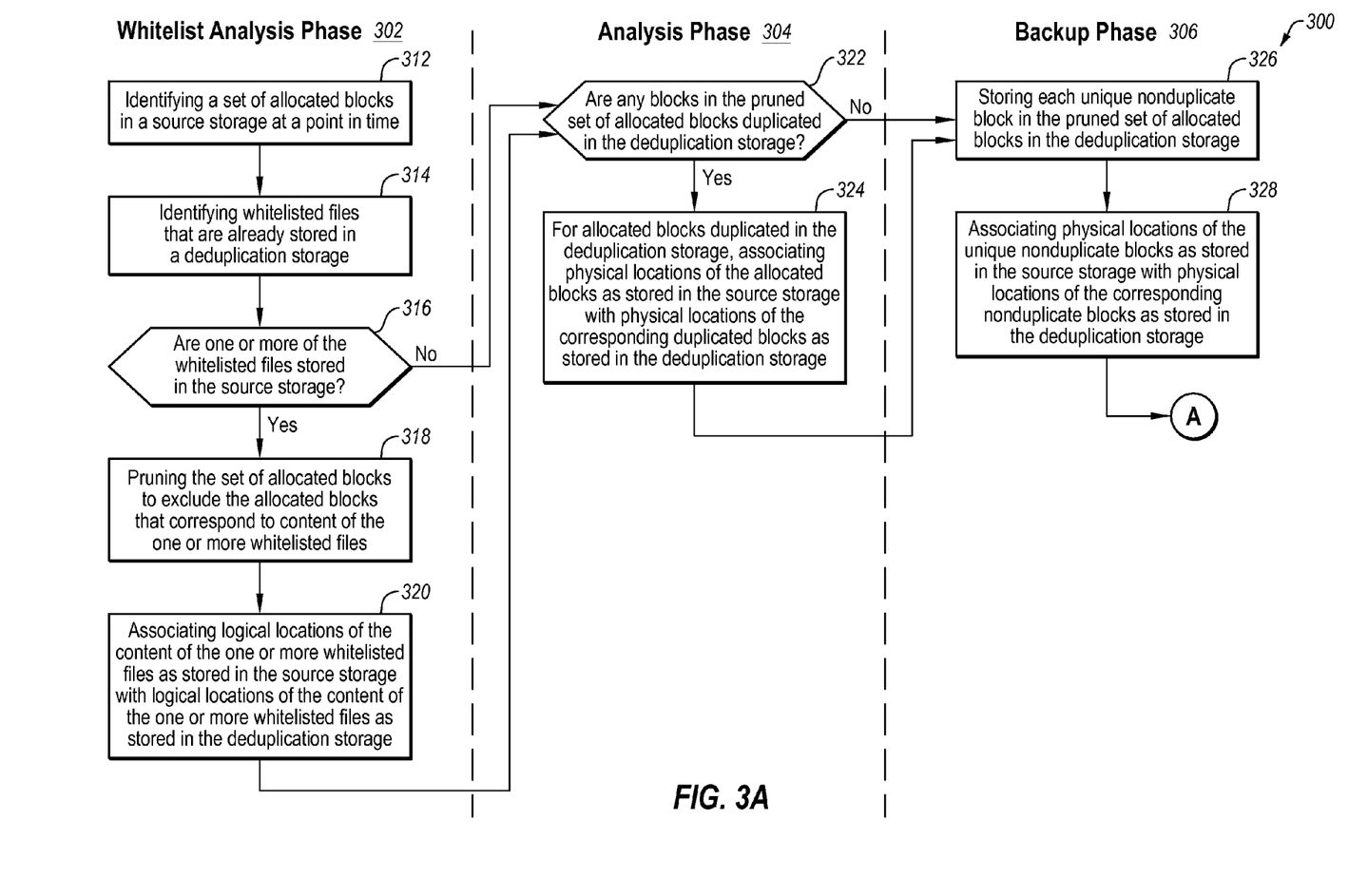
FIGS. 3A and 3B are a schematic flowchart illustrating an example method for optimizing backup and restore of whitelisted files.

As disclosed in FIG. 3A, the source storage 110 may include one or more blocks that include file system metadata (FSM) 204. The FSM 204 may include attribute data including, but not limited to, file name, file size, file creation date, file modification date, and block positions of the blocks that make up the content of each file stored in the source storage 110. The whitelist 206 may include similar, or additional, file attribute data for the whitelisted files stored in the deduplication storage 108, such as a subset of file content and/or a hash or hashes of a subset of file content. In addition, the backup of the source storage 110 may include identifying a set 202 of allocated blocks in the source storage at the point in time of the backup, which is time t(1). As disclosed in FIG. 2B, a pruned set 208 of allocated blocks may exclude the allocated blocks that correspond to content of the whitelisted files stored in the whitelist 206. As disclosed in FIG. 2C, blocks from the source storage 110 that are not already stored in the deduplication storage 108 may be copied to the deduplication storage 108 during the backup of the source storage 110, including the block or blocks that include the FSM 204 of the source storage 110. Finally, as disclosed in FIGS. 2D and 2E, the backup of the source storage 110 that was stored in the deduplication storage 108 may later be restored to the restore storage 112. Additional discussion of FIGS. 2A-2E is included below in connection with the discussion of FIGS. 3A and 3B.

Figure 3B:
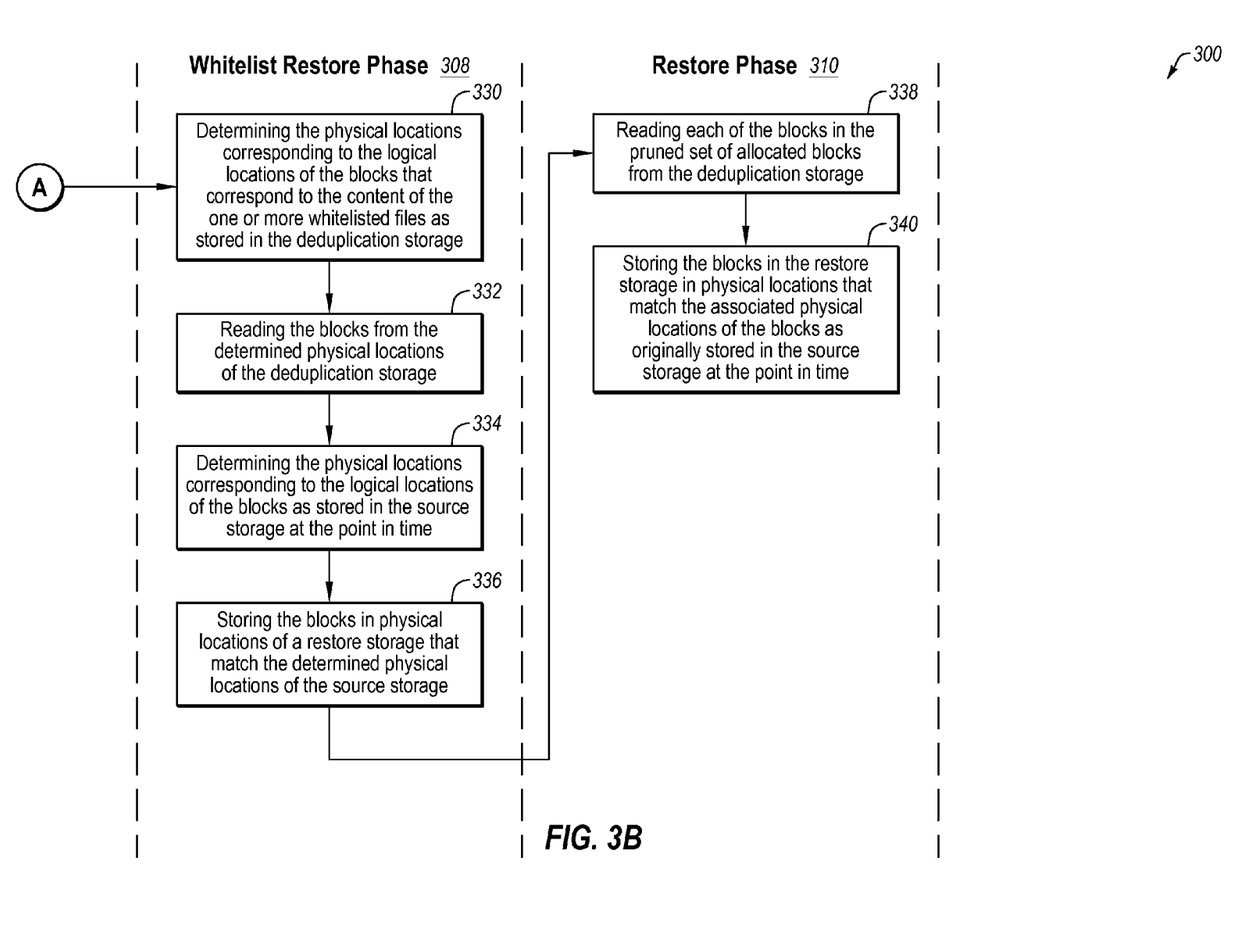

FIGS. 3A and 3B are a schematic flowchart illustrating an example method 300 for optimizing backup and restore of whitelisted files in the source storage 110 during backup and restore of the source storage 110. The method 300 may be implemented, in at least some embodiments, by the whitelist module 122 and the deduplication module 118 of FIG. 1. For example, these modules may be configured to execute computer instructions to perform operations of optimizing backup and restore of whitelisted files, as represented by one or more of phases 302-310 which are made up of the steps 312-340 of the method 300. Although illustrated as discrete phases and steps, various phases/steps may be divided into additional phases/steps, combined into fewer phases/steps, reordered, or eliminated, depending on the desired implementation. Also, prior to the method 300, various whitelisted files may have been backed up into, or seeded into, the deduplication storage 108. The method 300 will now be discussed with reference to FIGS. 1, 2A-2E, and 3A-3B.

The method 300 may include a whitelist analysis phase 302, an analysis phase 304, a backup phase 306, a whitelist restore phase 308, and a restore phase 310.

The whitelist analysis phase 302 of the method 300 may include a step 312 of identifying a set of allocated blocks in a source storage at a point in time. For example, the whitelist module 122 of FIG. 1 may identify, at step 312, that the blocks 110(1)-110(5), 110(7), and 110(8) in the source storage 110 at time t(1) are allocated, as disclosed in FIG. 2A. The whitelist module 122 may store this set of allocated blocks as a list "1, 2, 3, 4, 5, 7, 8" or in any other format such as "1-5, 7-8" in the set 202 of allocated blocks of FIG. 2A.

The whitelist analysis phase 302 of the method 300 may include a step 314 of identifying whitelisted files that are already stored in a deduplication storage. Continuing with the above example, the whitelist module 122 of FIG. 1 may identify, at step 314, the files named "FileA.SYS," "FileE.EXE," and "FileF.WIM" that are listed in the whitelist 206 as whitelisted files that are already stored in the deduplication storage 108.

The whilelisted files that are listed in the whitelist 206 may have been previously seeded into the deduplication storage 108, or may have been previously backed up into the deduplication storage 108 from a source storage such as the source storage 110. In either case, the whitelisted files may be identified and added to the whitelist 206 by analyzing files that are candidates for seeding, or that are stored in the deduplication storage 108, to identify common files having an attribute of particular interest, such as a certain file extension (e.g., ".WIM") or a certain size that is above a predetermined threshold size (e.g., >1 GB). These attributes may be stored in file system metadata and/or may be stored in blocks of the files themselves, for example. For example, where a file is larger than a predetermined threshold size and is included in the backups of multiple source storages, the whitelist module 122 may identify the file as a whitelisted file and add the file to the whitelist 206. This procedure may include gaining file level access to files from multiple storages that have been backed up into the deduplication storage 108 and comparing file attribute data stored in file system metadata of each of the multiple backed-up storages to identify common files having a size that is above a predetermined threshold size. This comparing may include comparing hashes, stored in the deduplication storage 108, of blocks of the common files to verify that the common files are identical. Additionally or alternatively, this comparing may include comparing additional file attribute data stored in blocks of files in the multiple backed-up storages to identify common files.

The whitelist analysis phase 302 of the method 300 may include a decision step 316 of determining if one or more of the whitelisted files are stored in the source storage. Continuing with the above example, the whitelist module 122 of FIG. 1 may determine, at step 316, if one or more of the whitelisted files that are listed in the whitelist 206 of FIG. 2A are stored in the source storage 110. If not (No at step 316), the method 300 may proceed to step 322 of the analysis phase 304. Conversely, if so (Yes at step 316), the method 300 may proceed to step 318 of the whitelist analysis phase 302. Continuing with the above example, the whitelist module 122 of FIG. 1 may determine, at step 316, that the whitelisted file named "FileA.SYS" that is listed in the whitelist 206 of FIG. 2A is stored in the source storage 110, as indicated in the FSM 204.

The whitelist analysis phase 302 of the method 300 may include the step 318 of pruning the set of allocated blocks to exclude the allocated blocks that correspond to content of the one or more whitelisted files. Continuing with the above example, the whitelist module 122 of FIG. 1 may prune, at step 318, the set 202 of allocated blocks of FIG. 2A to exclude the allocated blocks 110(3), 110(4), and 110(7) that correspond to content of the whitelisted file named "FileA.SYS," resulting in the pruned set 208 of allocated blocks of FIG. 2B.

The whitelist analysis phase 302 of the method 300 may include the step 320 of associating logical locations of the content of the one or more whitelisted files as stored in the source storage with logical locations of the content of the one or more whitelisted files as stored in the deduplication storage. Continuing with the above example, the whitelist module 122 of FIG. 1 may associate, at step 320, the logical locations of the content of the whitelisted file named "FileA.SYS" as stored in the source storage 110 with logical locations of the content of the whitelisted file named "FileA.SYS" as stored in the deduplication storage 108. This logical association is represented by the line between "FileA.SYS" in the FSM 204 and "FileA.SYS" in the whitelist 206 in FIG. 2B.

Continuing with the above example, by the conclusion of the whitelist analysis phase 302 of the method 300, the blocks 110(3), 110(4), and 110(7), that correspond to content of the whitelisted file named "FileA.SYS," may have been identified and pruned from the set 202 of allocated blocks. Since the whitelisted file named "FileA.SYS" is already stored in the deduplication storage 108, the identification of these blocks allows the method 300 to associate logical locations of these blocks as stored in the source storage 110 with logical locations of these blocks as stored in the deduplication storage 108 without the overhead normally associated with backing up these blocks. In particular, this identification, pruning, and association may avoid overhead associated with analyzing these blocks during the analysis phase 304 or transporting and storing these blocks during the backup phase 306. Where the whitelisted file is relatively large, this savings in overhead can be substantial.

The analysis phase 304 of the method 300 may include a decision step 322 of determining if any blocks in the pruned set of allocated blocks are duplicated in the deduplication storage. Continuing with the above example, the deduplication module 118 of FIG. 1 may determine, at step 322, if any blocks in the pruned set 208 of allocated blocks in FIG. 2B are duplicated in the deduplication storage 108. If not (No at step 322), the method 300 may proceed to step 326 of the backup phase 306. Conversely, if so (Yes at step 322), the method 300 may proceed to step 324 of the analysis phase 304. Continuing with the above example, the deduplication module 118 of FIG. 1 may determine, at step 322, that the block 110(2) in the pruned set 208 of allocated blocks in FIG. 2B is already duplicated in block 108(11) in the deduplication storage 108. This determination may be made, for example, by comparing hashes of the blocks in the pruned set 208 of allocated blocks in FIG. 2B to hashes of the blocks stored in the duplication storage 110.

The analysis phase 304 of the method 300 may include a step 324 of, for allocated blocks duplicated in the deduplication storage, associating physical locations of the allocated blocks as stored in the source storage with physical locations of the corresponding duplicated blocks as stored in the deduplication storage. Continuing with the above example, the deduplication module 118 of FIG. 1 may associate, at step 324, a physical location of offset (2) of the allocated block 110(2) as stored in the source storage 110 with a physical location of offset (11) of the corresponding duplicated block 108(11) as stored in the deduplication storage 108. This association, which is represented by the line between block 110(2) and 108(11) in FIG. 2B, may include, for example, creating a metadata node in a metadata record in the metadata 116.

The backup phase 306 of the method 300 may include the step 326 of storing each unique nonduplicate block in the pruned set of allocated blocks in the deduplication storage. Continuing with the above example, the deduplication module 118 of FIG. 1 may store, at step 326, each unique nonduplicate block in the set 210 of unique nonduplicate blocks of FIG. 2C in the deduplication storage 108. It is noted that the set 210 of unique nonduplicate blocks of FIG. 2C is the same as the pruned set 208 of allocated blocks of FIG. 2B except that the block at offset (2) that was identified and associated in steps 322 and 324 has been eliminated. This storing, which is represented by the dashed lines and arrows in FIG. 2C, includes storing block 110(1) in block 108(2), block 110(5) in block 108(13), and block 110(8) in block 108(14).

The backup phase 306 of the method 300 may include the step 328 of associating physical locations of the unique nonduplicate blocks as stored in the source storage with physical locations of the corresponding nonduplicate blocks as stored in the deduplication storage. Continuing with the above example, the deduplication module 118 of FIG. 1 may associate, at step 328, physical locations of offsets (1), (5), and (8) of the unique allocated blocks 110(1), 110(5), and 110(8), respectively, as stored in the source storage 110 with physical locations of offsets (2), (13), and (14) of the corresponding nonduplicate blocks 108(2), 108(13), and 108(14), respectively, as stored in the deduplication storage 108. This association, which is represented by the dashed lines and arrows in FIG. 2C, may include, for example, creating metadata nodes in a metadata record in the metadata 116.

Continuing with the above example, by the conclusion of the analysis phase 304 and backup phase 306 of the method 300, a full backup of the source storage 110, such as the full backup disclosed in FIG. 1, will be stored in the deduplication storage 108. Due to the whitelist phase 302, however, this full backup is accomplished for whitelisted files, such as the whitelisted file named "FileA.SYS," without the usual overhead associated with analyzing and backing up the content of the whitelisted files.

At some point after the creation of the full backup of the source storage 110, a user may decide to restore the full backup to the restore storage 112 or to another storage. This restore of the full backup can be accomplished using the whitelist restore phase 308 and the restore phase 310.

The whitelist restore phase 308 of the method 300 may include a step 330 of determining the physical locations corresponding to the logical locations of the blocks that correspond to the content of the one or more whitelisted files as stored in the deduplication storage. Continuing with the above example, the deduplication module 118 of FIG. 1 may determine, at step 330, the physical locations corresponding to the logical locations of the blocks that correspond to the content of the whitelisted file named "FileA.SYS" as stored in the deduplication storage 108, since the whitelisted file named "FileA.SYS" was previously associated with the full backup of the source storage 110, as represented by the line between "FileA.SYS" in the FSM 204 and "FileA.SYS" in the whitelist 206 in FIG. 2D. As disclosed in FIG. 2D, the deduplication module 118 may determine these physical locations by accessing the whitelist 206 to determine that these physical locations are offsets (9), (3), and (15) in the deduplication storage 108.

The whitelist restore phase 308 of the method 300 may include a step 332 of reading the blocks from the determined physical locations of the deduplication storage. Continuing with the above example, the deduplication module 118 of FIG. 1 may read, at step 332, the blocks 108(9), 108(3), and 108(15) from the determined physical locations of offsets (9), (3), and (15) of the deduplication storage 108, as disclosed in FIG. 2D.

The whitelist restore phase 308 of the method 300 may include a step 334 of determining the physical locations corresponding to the logical locations of the blocks as stored in the source storage at the point in time. Continuing with the above example, the deduplication module 118 of FIG. 1 may determine, at step 334, the physical locations corresponding to the logical locations of the blocks that correspond to the content of the whitelisted file named "FileA.SYS" as stored in the source storage 110 at time t(1). As disclosed in FIG. 2D, the deduplication module 118 may determine these physical locations by accessing the FSM 204 of the full backup, which is located in block 108(2), to determine that these physical locations were offsets (3), (7), and (4) in the source storage 110 at time t(1).

The whitelist restore phase 308 of the method 300 may include a step 336 of storing the blocks in physical locations of a restore storage that match the determined physical locations of the source storage. Continuing with the above example, the deduplication module 118 of FIG. 1 may store, at step 336, the blocks 108(9), 108(3), and 108(15) in physical locations of offsets (3), (7), and (4) of the restore storage 112 that matched the physical locations of offsets (3), (7), and (4) of the source storage 110 that were determined at step 334, as disclosed in FIG. 2D. This storing is represented as arrows in FIG. 2D.

The restore phase 310 of the method 300 may include a step 338 of reading each of the blocks in the pruned set of allocated blocks from the deduplication storage. Continuing with the above example, the deduplication module 118 of FIG. 1 may read, at step 338, each of the blocks 108(2), 108(11), 108(13), and 108(14) from the deduplication storage 108, as disclosed in FIG. 2E, that correspond to the pruned set 208 of allocated blocks, as disclosed in FIG. 2B. The locations of these blocks in the deduplication storage may be determined, for example, by accessing the metadata 116 of FIG. 1.

The restore phase 310 of the method 300 may include a step 340 of storing the blocks in the restore storage in physical locations that match the associated physical locations of the blocks as originally stored in the source storage at the point in time. Continuing with the above example, the deduplication module 118 of FIG. 1 may store, at step 340, the blocks 108(2), 108(11), 108(13), and 108(14) in the restore storage 112 in physical locations of offsets (1), (2), (5) and (8) that match the associated physical locations of offsets (1), (2), (5) and (8) of the blocks as originally stored in the source storage 110 at time t(1), as disclosed in FIG. 2E. This storing is represented as arrows in FIG. 2E.

It is understood that the foregoing discussion of the method 300 is but one possible implementation of a method of optimizing backup and restore of whitelisted files, and various modifications are possible and contemplated. For example, the method 300 may be modified to remove one or more of the steps in the phases 304-310. In addition, although the method 300 is directed toward optimizing backup of whitelisted files into a deduplication storage, it is understood that the method 300 could be modified to instead optimize backup of whitelisted files into a destination storage that is not configured for deduplication of blocks. In this modification of the method 300, the steps of the analysis phase 304 may be eliminated, the steps of the backup phase 306 may be performed on all allocated blocks instead of only unique nonduplicate allocated blocks, and the step 328 may be eliminated or may be inherent in the format of the image backup.

The embodiments described herein may include the use of a special-purpose or general-purpose computer, including various computer hardware or software modules, as discussed in greater detail below.

Embodiments described herein may be implemented using non-transitory computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store one or more desired programs having program code in the form of computer-executable instructions or data structures and which may be accessed and executed by a general-purpose computer, special-purpose computer, or virtual computer such as a virtual machine. Combinations of the above may also be included within the scope of computer-readable media.

Computer-executable instructions comprise, for example, instructions and data which, when executed by one or more processors, cause a general-purpose computer, special-purpose computer, or virtual computer such as a virtual machine to perform a certain method, function, or group of methods or functions. Although the subject matter has been described in language specific to structural features and/or methodological steps, it is to be understood that the subject matter defined in the appended claims is not necessarily limited to the specific features or steps described above. Rather, the specific features and steps described above are disclosed as example forms of implementing the claims.

As used herein, the term "module" may refer to software objects or routines that execute on a computing system. The different modules or filters described herein may be implemented as objects or processes that execute on a computing system (e.g., as separate threads). While the system and methods described herein are preferably implemented in software, implementations in hardware or a combination of software and hardware are also possible and contemplated.

All examples and conditional language recited herein are intended for pedagogical objects to aid the reader in understanding the example embodiments and the concepts contributed by the inventor to furthering the art, and are to be construed as being without limitation to such specifically-recited examples and conditions.

The invention claimed is:

1. A method of optimizing backup of whitelisted files in a source storage during deduplication of the source storage, the method being executed by one or more processors, the method comprising:
    a whitelist analysis phase that includes:
        identifying a set of allocated blocks in the source storage at a point in time;
        identifying whitelisted files that are already stored in a deduplication storage;
        determining whether one or more of the whitelisted files are stored in the source storage by analyzing file attribute data stored in file system metadata in the source storage;
        responsive to one or more of the whitelisted files being stored in the source storage, pruning the set of allocated blocks to exclude the allocated blocks that correspond to content of the one or more whitelisted files; and
        associating logical locations of the content of the one or more whitelisted files as stored in the source storage with logical locations of the content of the one or more whitelisted files as stored in the deduplication storage;
    an analysis phase that is performed after completion of the whitelist analysis phase and that includes, for each block in the pruned set of allocated blocks:
        determining if the allocated block is duplicated in the deduplication storage; and
        responsive to the allocated block being duplicated in the deduplication storage, associating a physical location of the allocated block as stored in the source storage with a physical location of the corresponding duplicated block as stored in the deduplication storage;
    a backup phase that is performed after completion of the analysis phase and that includes, for each unique nonduplicate block in the pruned set of allocated blocks:
        storing the unique nonduplicate block in the deduplication storage; and
        associating a physical location of the unique nonduplicate block as stored in the source storage with a physical location of the corresponding block as stored in the deduplication storage; and a whitelist restore phase that is performed after completion of the backup phase and that includes the following steps for the blocks that correspond to the content of the one or more whitelisted files:
  determining the physical locations corresponding to the logical locations of the blocks as stored in the deduplication storage;
  reading the blocks from the determined physical locations of the deduplication storage;
  determining the physical locations corresponding to the logical locations of the blocks as stored in the source storage at the point in time; and
  storing the blocks in physical locations of a restore storage that match the determined physical locations of the source storage.

2. The method as recited in claim 1, wherein the whitelisted files includes files that have been seeded into the deduplication storage, the seeded whitelisted files each having a size that is above a predetermined threshold size.

3. The method as recited in claim 1, wherein the identifying the whitelisted files includes:
  gaining file level access to files from multiple storages that have been backed up into the deduplication storage; and
  comparing file attribute data stored in file system metadata of each of the multiple backed-up storages to identify common files having a size that is above a predetermined threshold size.

4. The method as recited in claim 3, wherein the comparing the file attribute data further includes comparing hashes, stored in the deduplication storage, of blocks of the common files to verify that the common files are identical.

5. The method as recited in claim 3, wherein the comparing the file attribute data further includes comparing additional file attribute data stored in blocks of files in the multiple backed-up storages to identify common files.

6. The method as recited in claim 1, wherein the analyzing the file attribute data further includes analyzing additional file attribute data stored in blocks of the files that are stored in the source storage.

7. The method as recited in claim 1, wherein the whitelisted files includes a particular Windows Image Boot (WIMBoot) file.

8. The method as recited in claim 1, further comprising:
  a restore phase that is performed after completion of the backup phase and that includes the following steps for each of the blocks in the pruned set of allocated blocks:
    reading the block from the deduplication storage; and
    storing the block in the restore storage in a physical location that matches the associated physical location of the block as originally stored in the source storage at the point in time.

9. One or more non-transitory computer-readable media storing one or more programs that are configured, when executed, to cause the one or more processors to execute the method as recited in claim 1.

10. The method as recited in claim 1, wherein the whitelisted files include files that have been seeded into the deduplication storage.

11. The method as recited in claim 1, wherein the identifying the whitelisted files includes analyzing files stored in the deduplication storage to identify common files having a size that is above a predetermined threshold size.

* * * * *